Patented Sept. 12, 1922.

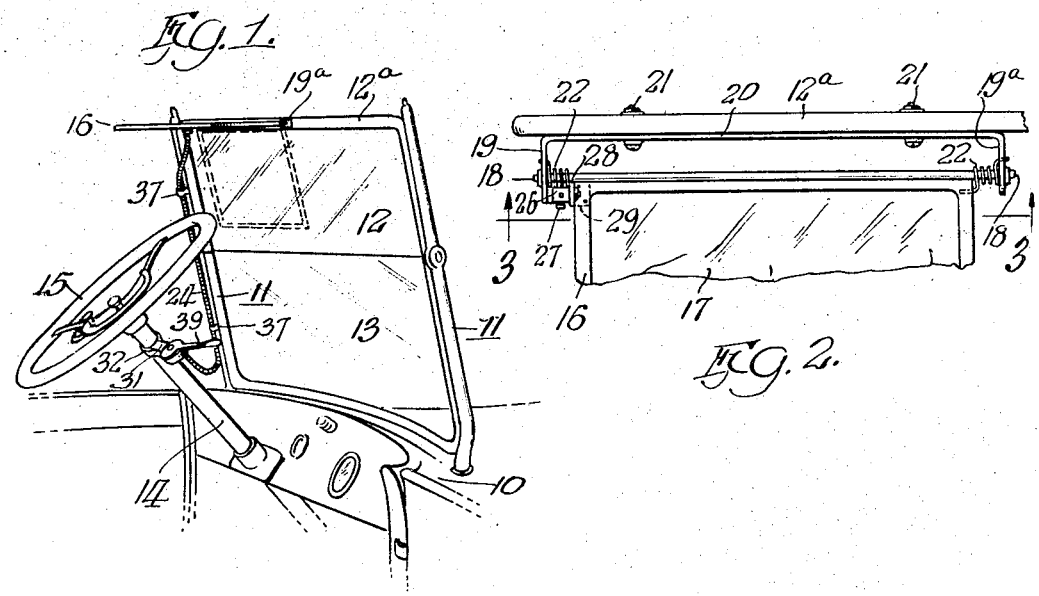

1,429,034

UNITED STATES PATENT OFFICE.

WILLIAM E. HASELTINE, OF RIPON, WISCONSIN.

ANTIGLARE DEVICE FOR MOTOR VEHICLES.

Application filed December 5, 1921. Serial No. 519,859.

*To all whom it may concern:*

Be it known that I, WILLIAM E. HASELTINE, a citizen of the United States, and a resident of Ripon, in the county of Fond du Lac and State of Wisconsin, have invented certain new and useful Improvements in Antiglare Devices for Motor Vehicles; and I do hereby declare that the following is a full, clear, and exact description thereof, reference being had to the accompanying drawings, and to the letters of reference marked thereon, which form a part of this specification.

This invention relates to improvements in anti-glare devices for motor vehicles and consists of the matters hereinafter described and more particularly pointed out in the appended claims.

The object of the invention is to provide an anti-glare device consisting of a screen of colored, semi-opaque or opaque material, capable of being hinged to the wind shield of an automobile so that it may be adjusted to screen the eyes of the driver from the glare of approaching headlights or of the sun, leaving the vision below or at either side of the screen unobstructed; and of means including a controlling device, within easy reach of the hand or foot of the driver, as a lever attached to the steering post near the steering wheel, for adjusting the screen at any angle from a horizontal, inoperative position to a vertical, maximum operative position.

The many advantages of the invention will appear as I proceed with my specification.

In the drawings:—

Figure 1 is a perspective view of parts of a motor vehicle, to which my improved anti-glare device has been applied;

Figure 2 is a top plan view of one end of a motor vehicle wind-shield, showing the anti-glare panel of my device in position thereon;

Fig. 3 is a vertical sectional view on an enlarged scale, taken on the line 3—3 of Fig. 2;

Figure 4 is a horizontal sectional view through the steering post of a motor vehicle to which my improved device has been applied and shows the operating lever thereof in top plan elevation;

Figure 5 is a vertical section on the line 5—5 of Fig. 4;

Figure 6 is a vertical section on the line 6—6 of Fig. 3; and

Figure 7 is a botton plan view of the operating lever proper, embodied in my improved anti-glare device.

Referring now in detail to that embodiment of the invention illustrated in the accompanying drawings: 10 indicates an automobile body, having the usual wind-shield posts 11 and top and bottom glass wind-shield sections 12 and 13. 14 indicates the steering post with the steering wheel 15 at the top end thereof. Said wind-shield sections as shown are of the pivoted or swinging type.

16 indicates a rectangular frame having an anti-glare panel 17 of semi-opaque or opaque material, such as suitable colored glass or celluloid. Preferably this frame is longer in one direction than the other and it is of such area that when it is in a position parallel with the wind-shield, it will substantially cover the driver's direct field of vision through the top section 12 of the wind-shield. The frame 16 has horizontally disposed end extensions 18 at one of its longer sides which have the bearing in the ears 19 and 19ª of a bracket strip 20, adapted to be secured to the inner surface of the top frame bar 12ª of the wind-shield section 12, toward the lefthand side thereof, by means of bolts 21. Preferably the ears 19—19ª are spaced a distant apart greater than the width of the panel frame 16, and surrounding the shaft extensions 18 at these points are coiled springs 22, 22 which have their ends so engaged with said ears and frame as to always act to swing said frame into a horizontal plane, at a right angle to the wind-shield. The ear 19 includes a horizontal flange 23 having a vertical hole to receive one end of a flexible conduit 24 in which is a flexible actuating member in the form of a wire 25. The proximate end of this wire is extended through a hole in a horizontally disposed block 26 and a set screw 27 locks the same in place therein. The block 26 has a reduced end which extends through and bears in an opening in the flange 28 of an angle clip 29 fixed to the adjacent corner of the frame 16, there being a nut on the reduced end of the block to hold it in position in said angle clip. It is apparent that when a downward pull is exerted on the wire 25, the panel frame 16 is swung downwardly toward the wind-shield section 12 against the action of the springs 22, which act to return the panel frame to its original horizontal position wherein it extends at a right angle to the wind-shield.

The other end of the flexible conduit and enclosed wire is connected with an operating lever mechanism which is as follows: Upon a fixed part of the automobile and preferably on the steering post 14 near the steering wheel 15, I mount a casing block 30. Said block includes a lateral extension 31 (see Figs. 4 and 5) having an end which is formed to fit upon the steering post, and a strap 32 is provided which surrounds the steering post and has its ends secured to the extension 31 by a screw 33. In the top surface of the block 30 is formed an annular recess or groove 34, about a centrally disposed lug 35 and in one part of the side wall of the casing block is a tangentially arranged hole 36 which opens into the recess or groove 34. The other end of the conduit 24 is fixed in the hole 36, while the associated end of the wire 25 extends therethrough and into the channel. Preferably, but not necessarily so, the conduit 24 is fixed at points between the ends to the left-hand wind-shield post 11 by means of clips 37 (see Fig. 1).
The annular recess 34 in the casing block is closed by the head or hub plate 38 of a lever handle 39, which head is pivoted to the axial lug 35 by means of a screw 40. On the underside of the head or hub plate of the lever is a plurality of lugs 41, 42 which extend into the annular recess 34 of the casing block. The lug 41 is so constructed and so attached to the head 38 as to be capable of a rotative movement about an axis parallel with the screw 40 and has a transverse hole therethrough to receive the associated end of the wire 25, a set screw 43 carried by said lug acting to secure the wire end to said lug. In the other lug 42 is provided a radially arranged recess to receive the stem 44 of a brake shoe 45. A spring 46 is arranged in the recess to normally urge the brake shoe in contact or engagement with the outer surface of the recess, the braking effect or resistance of this shoe being great enough to overcome the action of the springs 22 associated with the panel frame. Thus the lever 39 may be moved in one direction against the action of the springs 22 to swing the panel frame into any desired angular position and will then act to hold said frame in the adjusted position. When the lever is moved in the other direction, the springs 22 will return the panel frame to its normal horizontal position.

When the panel is in its normal inoperative position as shown in Fig. 1, it is out of the way of the driver and as the springs 22 always act to swing the panel frame upwardly, a tension is imparted to the wire 25 so that the panel frame is held rigidly against vibration and therefore it cannot rattle or make other objectionable noises.

When it is desired to shield or shade the eyes of the driver from the glare of the sun during the daytime or from the glare of headlights of approaching vehicles during the nighttime, the lever 39 is moved to swing the panel frame into the desired field of vision, the panel absorbing the glare. When the glare has passed, the lever is swung in the other direction and the springs 22 will then return the panel frame to its normal, out-of-the-way position. When the panel is down in the glare shielding position, the vision of the driver is unobstructed below or to either side of said panel frame.

The parts are few in number and easy to install and operate and do not, when installed, in any way interfere with the driver's freedom of movement.

While in describing my invention I have referred to certain details of mechanical construction and arrangements of parts, I do not wish to be limited thereto except as pointed out in the appended claims.

I claim as my invention:—

1. A device of the kind described, comprising, an anti-glare panel, a bracket adapted for attachment to the wind-shield frame of a motor vehicle, said panel being pivotally mounted in said bracket to swing on a horizontal axis, an operating member mounted on a fixed part of the motor vehicle, a member connecting the panel with said operating member, and a braking device associated with the operating member for holding it in the desired position.

2. A device of the kind described, comprising, an anti-glare panel, a bracket adapted for attachment to the wind-shield frame of a motor vehicle, said panel being pivotally mounted in said bracket to swing on a horizontal axis, yielding means associated with the pivotal connection between the panel and bracket, normally acting to swing the panel upwardly, an operating lever mounted to swing upon a fixed part of the motor vehicle, a member connecting the panel with the operating lever, and a braking device associated with the operating lever for holding the same in the desired position against the action of said yielding means.

3. A device of the kind described comprising, an anti-glare panel adapted to be secured to the wind-shield of a motor vehicle so as to be swung about a horizontal axis, an operating mechanism therefor, including a casing part adapted to be secured to the steering post of the motor vehicle and a lever part pivoted to swing upon said casing part, a flexible member connected at one end to said panel and at its other end to said lever part within the casing part, and a yielding brake shoe carried by said lever part and engaging said casing part for holding said lever part in the desired position with respect to said casing part.

4. A device of the kind described comprising, an anti-glare panel adapted to be secured to the wind-shield of a motor vehicle so as to be swung about a horizontal axis, an operating mechanism therefor, including a casing part having an annular channel and being adapted to be secured to the steering post of the motor vehicle and a lever part pivoted on the casing part to close said annular channel, said lever part having a plurality of lugs extending into said annular channel, a spring pressed brake shoe carried by one of said lugs and engaging one wall of said channel, and a flexible operating member having one end connected to the other lug of said lever within the channel and having its other end connected to said panel.

In testimony that I claim the foregoing as my invention, I affix my signature in the presence of two witnesses, this 1st day of Dec., A. D. 1921.

WILLIAM E. HASELTINE.

Witnesses:
CLARENCE E. MEHLHOPE,
T. H. ALFREDS.